Figure 1:
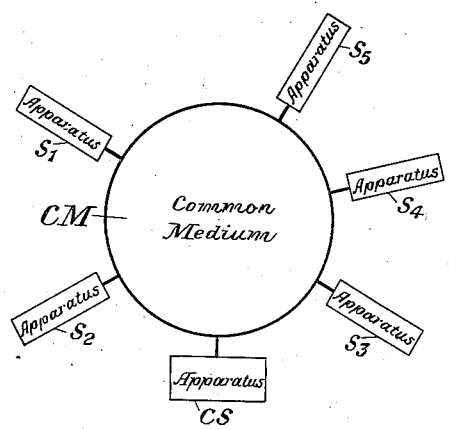

Dec. 22, 1936.  E. I. GREEN  2,064,905

COMMON MEDIUM MULTICHANNEL EXCHANGE SYSTEM

Filed May 26, 1934  8 Sheets—Sheet 1

INVENTOR
E. I. Green
BY
ATTORNEY

Dec. 22, 1936.  E. I. GREEN  2,064,905
COMMON MEDIUM MULTICHANNEL EXCHANGE SYSTEM
Filed May 26, 1934  8 Sheets-Sheet 2

INVENTOR
E. I. Green
BY
ATTORNEY

Dec. 22, 1936.  E. I. GREEN  2,064,905
COMMON MEDIUM MULTICHANNEL EXCHANGE SYSTEM
Filed May 26, 1934  8 Sheets-Sheet 3
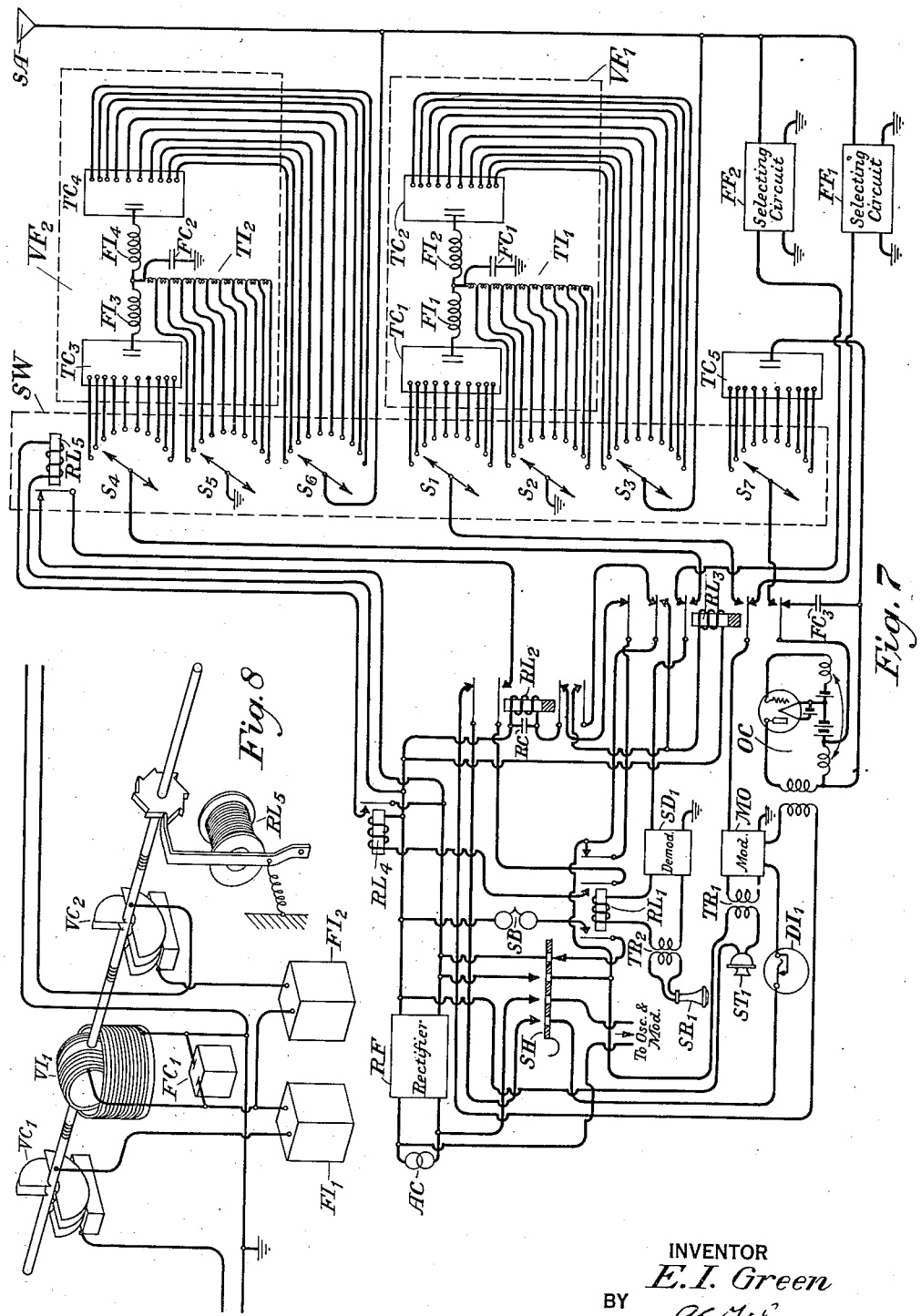
INVENTOR
E. I. Green
BY
ATTORNEY Dec. 22, 1936.   E. I. GREEN   2,064,905
COMMON MEDIUM MULTICHANNEL EXCHANGE SYSTEM
Filed May 26, 1934   8 Sheets-Sheet 6
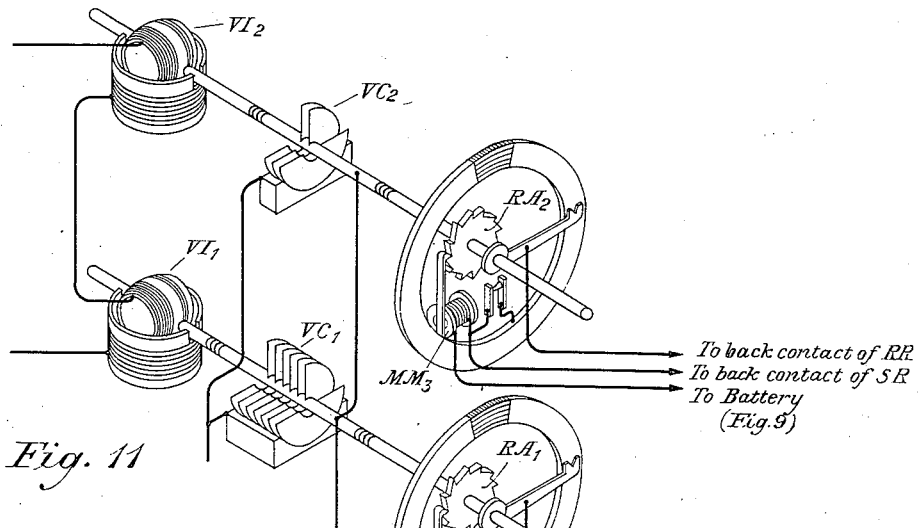
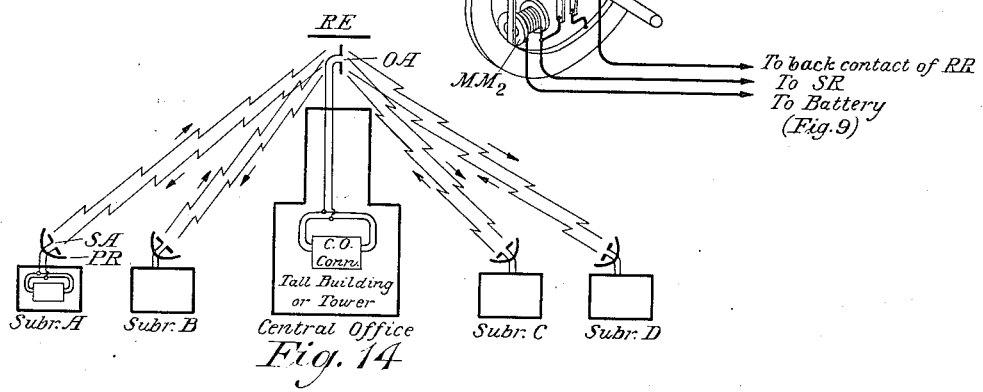
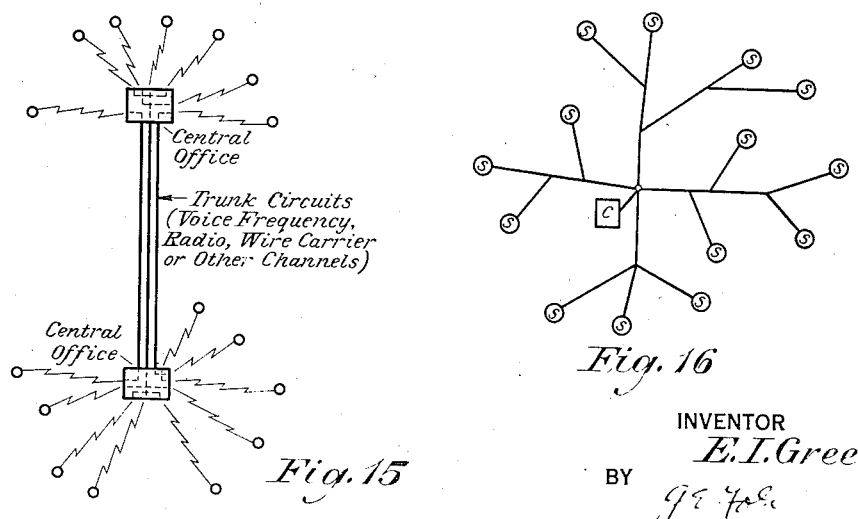
INVENTOR
E. I. Green
BY
ATTORNEY Dec. 22, 1936.      E. I. GREEN      2,064,905
COMMON MEDIUM MULTICHANNEL EXCHANGE SYSTEM
Filed May 26, 1934      8 Sheets-Sheet 7

INVENTOR
*E. I. Green*
BY
ATTORNEY

Dec. 22, 1936.    E. I. GREEN    2,064,905
COMMON MEDIUM MULTICHANNEL EXCHANGE SYSTEM
Filed May 26, 1934    8 Sheets-Sheet 8

INVENTOR
*E. I. Green*
BY
ATTORNEY

Patented Dec. 22, 1936

2,064,905

UNITED STATES PATENT OFFICE 2,064,905

COMMON MEDIUM MULTICHANNEL EXCHANGE SYSTEM

Estill Ibbotson Green, East Orange, N. J., assignor to American Telephone and Telegraph Company, a corporation of New York Application May 26, 1934, Serial No. 727,803

23 Claims. (Cl. 250—6)

This invention has for its object the provision of an exchange system in which communication between subscribers is carried out over channels of different frequency derived from a common transmission medium. More particularly, the invention is designed to utilize as a substitute for the many subscriber pairs which are employed in the ordinary telephone exchange system the many channels which are obtainable in the high frequency art as it is now unfolding and to provide means whereby these channels may be selected by subscribers at will and employed for interconnection.

In the telephone exchange systems which have heretofore been provided it has been the practice to group subscribers in central office areas. Each subscriber is connected to his own central office by means of an individual wire circuit or by a party line arranged for non-simultaneous use by a few subscribers. When a subscriber desires to call another subscriber he utilizes his own line to the central office, and upon passing the desired number either to an operator or to an automatic switching mechanism is connected to another line which extends either directly or via another office or offices to the called party. For a system of this kind many thousands of subscriber circuits are necessary in each central office area. These are commonly provided in the form of a network of multiple pair cables extending over the area.

In accordance with the present invention it is proposed to substitute for such individual wire circuits extending to each subscriber a transmission medium which is common to all subscribers and which will accommodate a range of frequencies sufficiently wide for a large number of telephone channels. Interconnection between subscribers is then carried out over these high frequency channels.

The essence of the invention resides in making available to a large number of subscribers a transmission medium capable of accommodating a wide range of frequencies so that the subscribers may utilize, for the purposes of intercommunicating, a plurality of signaling channels derived from the wide band medium. A transmission medium capable of handling the large number of channels required for the exchange system of the invention may be obtained by utilizing either radio transmission in space or high frequency transmission over a conducting or guiding medium.

Considering, first, the use of radio as the medium for transmitting the wide band of frequencies contemplated by the invention, the invention is designed to employ whatever part of the frequency range may be available. Heretofore, however, the radio frequency spectrum has scarcely afforded sufficient frequency space to yield the channel capacity required for a local telephone exchange system. With the opening up of the field of ultra-short waves this limitation as to channel capacity is removed. Thus, for example, between one and two meters there is a total frequency range of 150 megacycles while the range between 10 and 20 centimeters is 1500 megacycles. The frequency ranges obtainable through the use of still shorter waves are much greater.

With these ultra-high frequencies, however, nature imposes another limitation, i. e., the tendency of the waves to take on quasi-optical characteristics, so that they project only in straight lines and do not bend around corners to any considerable extent. Thus, it becomes necessary that subscribers utilizing such waves have a fairly clear line of sight between their antennas. Some diffraction around obstacles may, of course, be obtained, but, in general, reasonably clear line-of-sight projection without intervening obstacles appears to be called for. This, of course, has the disadvantage of making it possible to utilize the same ultra-high frequencies in different areas.

The line-of-sight characteristics of the ultra-short waves must be recognized in the design of a telephone exchange system utilizing this technique. In one form of the invention it is proposed to provide in the center of a community a central station with antennas mounted sufficiently high above the surrounding buildings to make possible the necessary directness of transmission between these antennas and practically any point in the territory to be served. One subscriber's station is then placed in connection with another by transmitting first to the central station and thence through the central station to the desired other subscriber located in another part of the community. The central station acts as a means for catching the waves from one subscriber at a relatively high point and transmitting them down again to a second subscriber, thus lifting the transmission path above any obstacles.

In order that such a central station may be economical, it is proposed to make it capable of handling simultaneously a wide band of frequencies such as would accommodate hundreds or perhaps thousands of channels. The particular arrangement of the central station will be hereinafter described.

As an alternative to the use of a radio transmission medium, the invention contemplates the employment of a guiding or conducting transmission path suitable for the required band of frequencies. Such a transmission path would be provided in the form of a network, extending to all the subscribers within a given area. Conceivably, such a network might be composed of ordinary wire circuits branched and interconnected so as to make the common circuit available to each subscriber. Thus, the wire network might be somewhat similar to the network employed for distributing light and power currents, except that a simple two-wire network without multi-phase connections, voltage transformation arrangements, etc., would suffice. It would, however, be possible to carry out the invention by employing the light and power network itself and this is contemplated within the scope of the invention.

The preferred form of guiding a transmission medium, however, is one which is designed for the transmission of a wide band of frequencies with comparatively low attenuation and preferably also with shielding to minimize the effect of external disturbances. Such a transmission medium may be found in a circuit consisting of two conductors disposed coaxially with respect to one another. In a properly designed coaxial circuit, low attenuation at high frequencies may be attained by the employment of conductors of suitably low high frequency resistance and the use of a substantially gaseous dielectric between the conductors. With this type of circuit the outer conductor serves also as a shield whose protective effect becomes more nearly perfect as the frequency is increased, so that at high frequencies practically complete immunity from external disturbances may be obtained.

The invention contemplates also as an alternative to the coaxial circuit a high frequency transmission medium comprising a circuit consisting of two conductors surrounded by a shield. Here again, the high frequency attenuation may be minimized by proper design with substantially gaseous insulation and the thickness of shield may be determined so as to minimize interference from external disturbances.

Yet another form of transmission medium suitable for carrying out the invention is a dielectric wave guide comprising a cylindriform dielectric material which may or may not be surrounded by a conductor. An advantageous form of such a transmission path is a hollow cylindrical conductor containing air or some other gas as the dielectric. This type of circuit is particularly adapted to transmit waves of very high frequencies, for example, of the order of a few centimeters or less in wave length.

Using any of the above types of transmission media, the interconnection of subscribers at will from the available channels involves a number of new and difficult problems which are solved by the various features of the invention as hereinafter disclosed.

Connection at the central office may be effected either (a) in much the same way as is now done by deriving out the channels into physical circuits which may be switched to one another, or (b) by interconnecting the channels at the central office at carrier frequencies, employing for this purpose a suitable modulating frequency. The central office connection may be effected manually or automatically.

One of the big functions involved in local exchange telephone systems is that of switching so that each subscriber is connected with any other subscriber. This operation is now carried out at the central offices by the switching of mechanical contacts either as a manual operation or by automatic equipment under remote control of the subscriber. In accordance with certain embodiments of the invention, it is proposed to carry out this function of interconnecting subscribers without the switching of mechanical contacts. This is accomplished by having the subscribers permanently connected to the common medium and completing the electrical path at a central office under the remote control of the subscriber by a process of modulation and/or frequency selection. Thus, an important object of the invention is the provision of means whereby mechanical switching may be replaced by "electrical switching". This electrical switching or interlinking is carried out by shifting the tuning of the circuits, by selecting the frequency of the carrier current, by shifting the frequencies in a modulator, or a combination of these. Selecting, modulating and multiplexing methods are, therefore, important features of the invention.

In general, the invention contemplates the assignment to each subscriber of a particular frequency or frequencies which might preferably be related to his telephone number. The assignment of frequencies should be such as to facilitate the interconnection of subscribers and various schemes of frequency allocation are suggested in the invention for this purpose.

Figure 3:
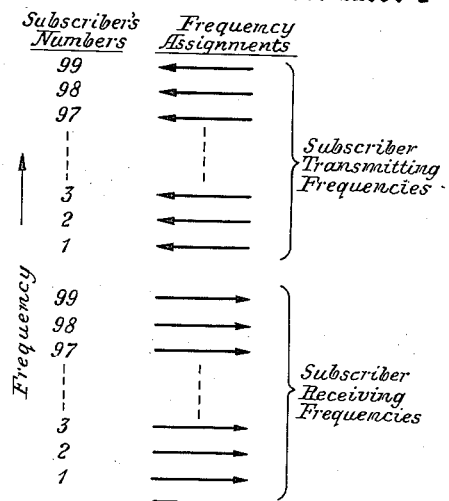
Figure 2:
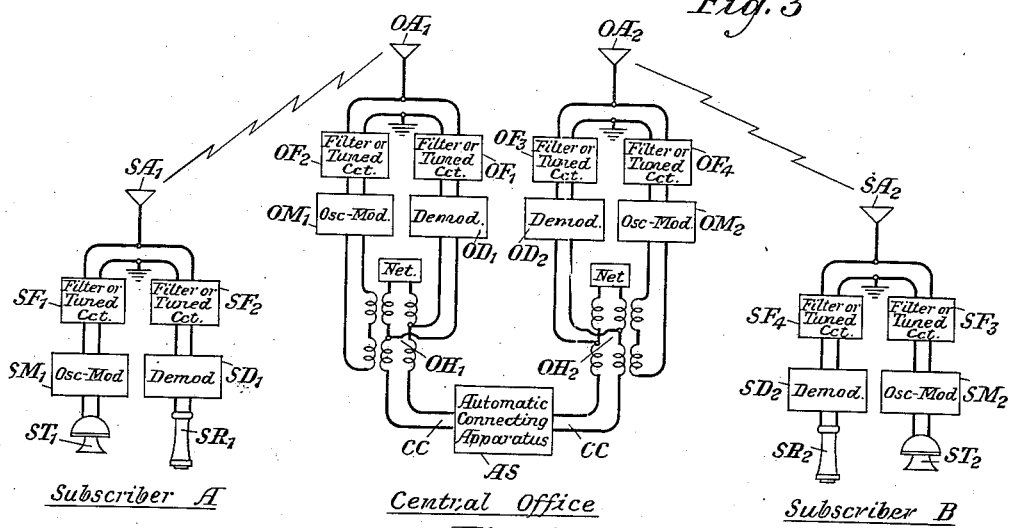
Figure 4:
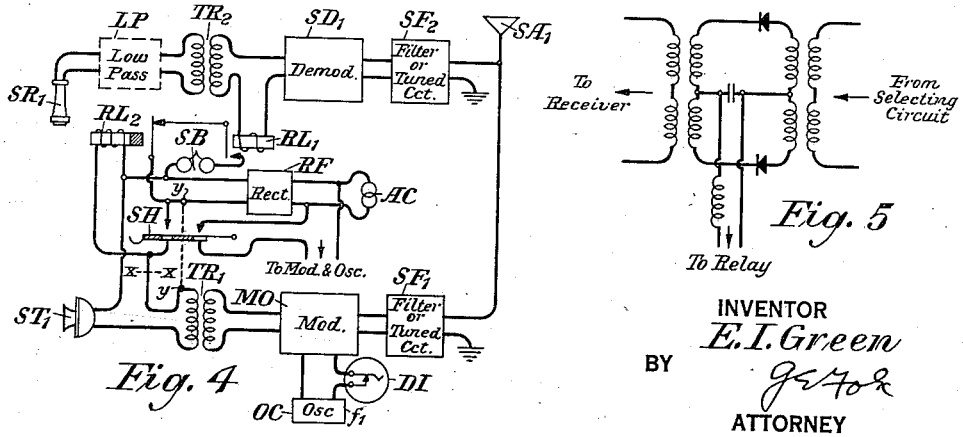
Figure 5:
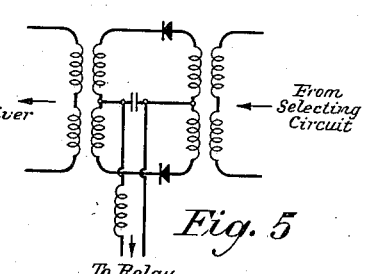
Figure 6:
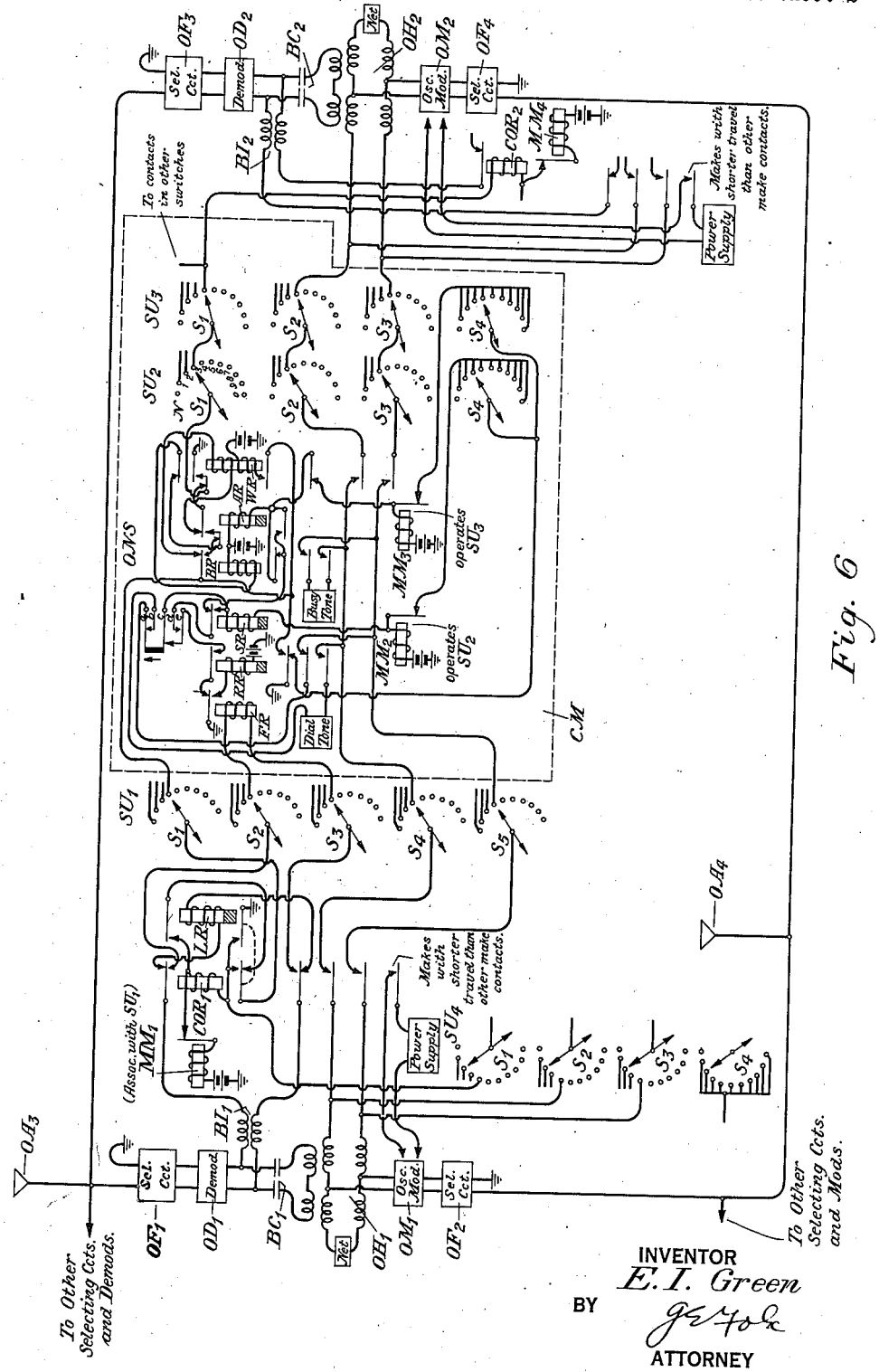
Figure 9:
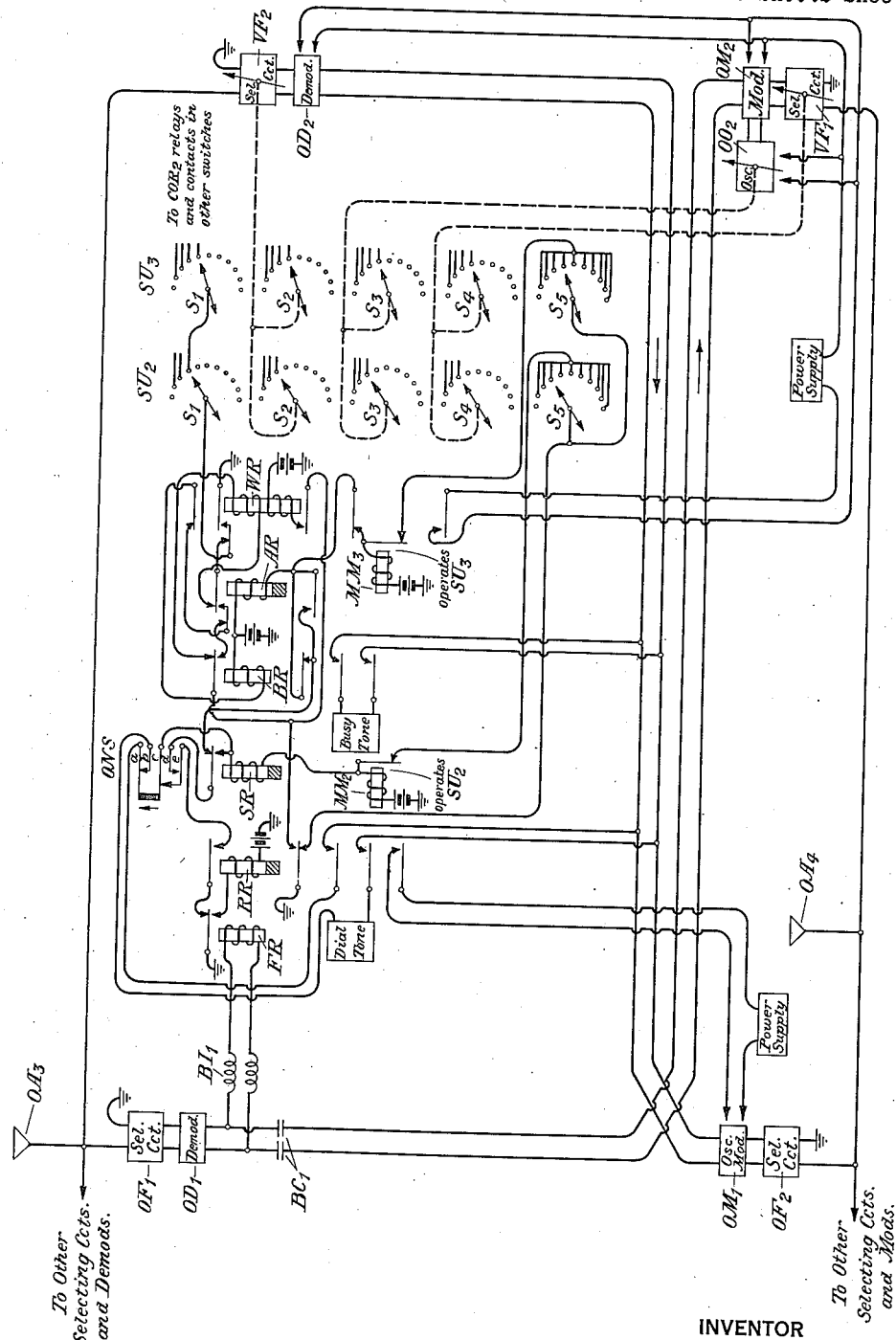
Figure 10:
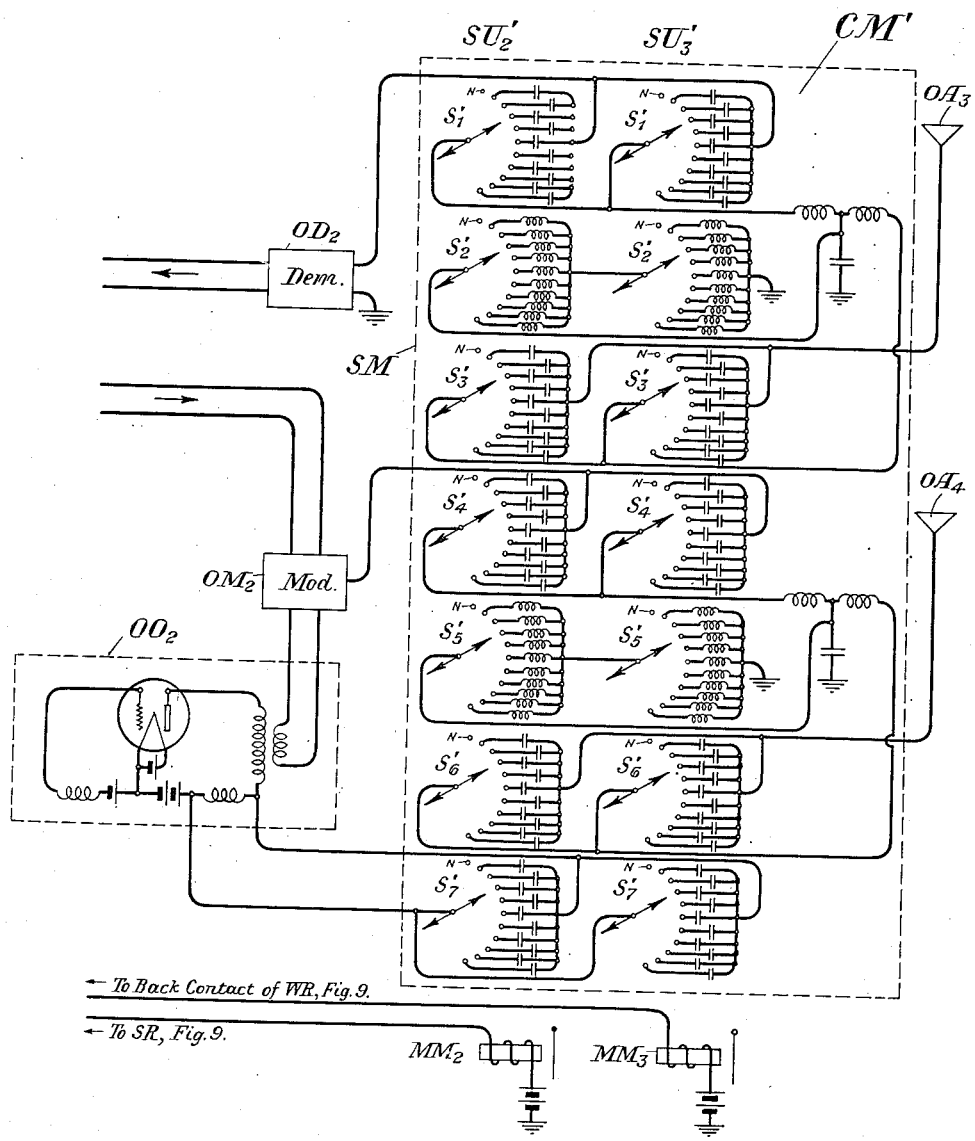
Figure 12:
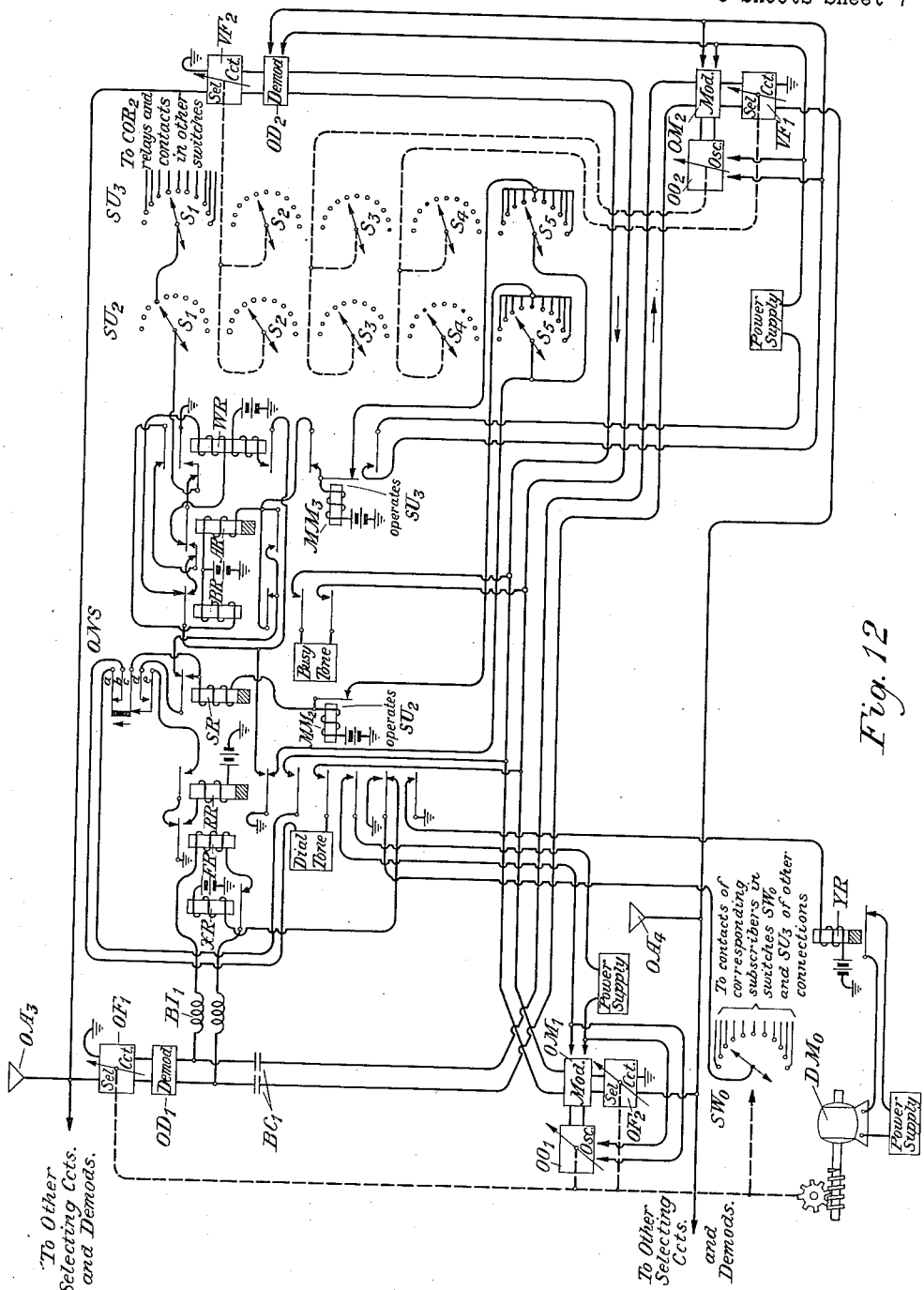
Figure 13:
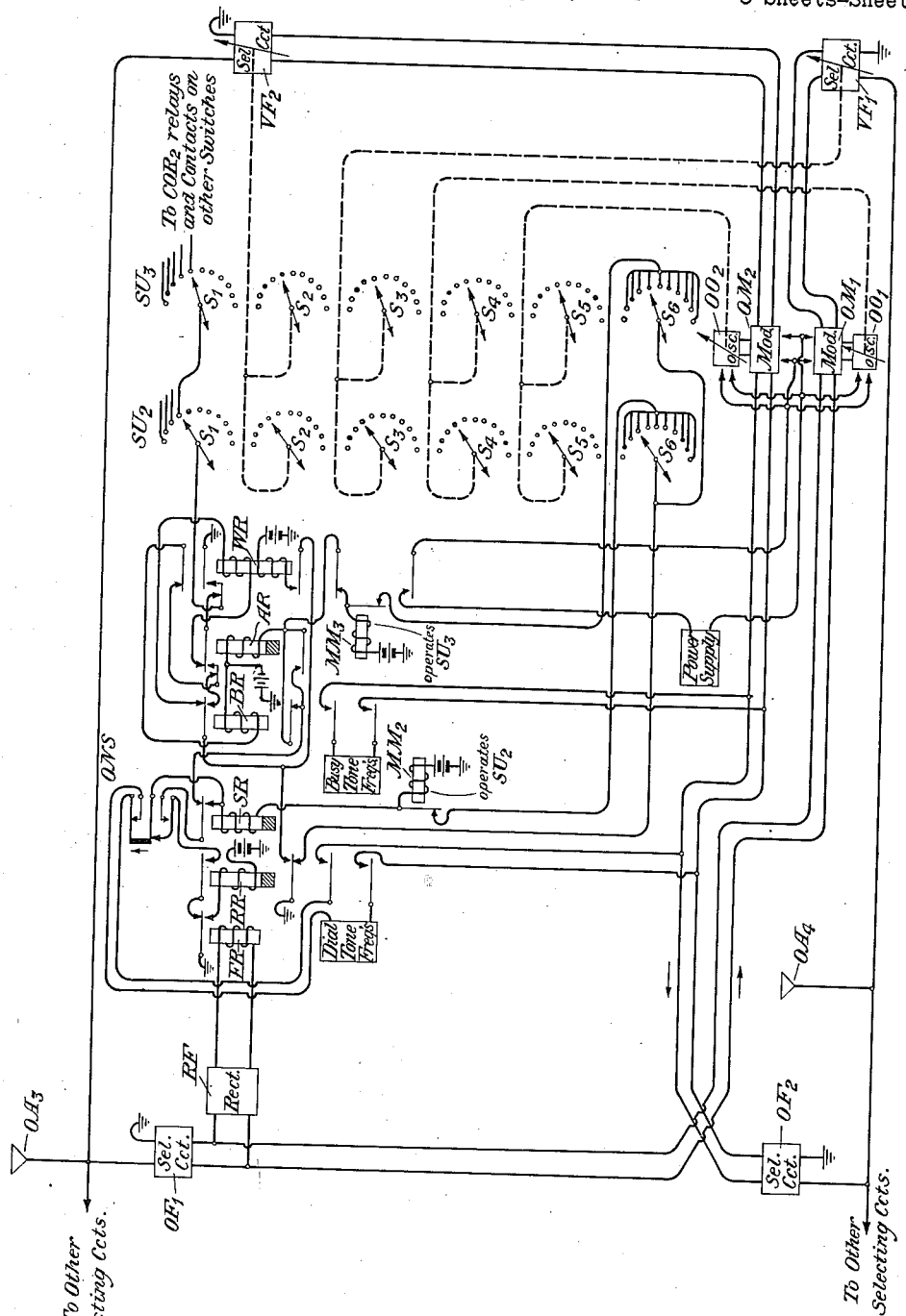

The foregoing outline having indicated some of the principles of the invention as well as a few of its major objects, the complete invention with its various details, features and purposes will now be understood from the following description when read in connection with the accompanying drawings, in which Fig. 1 shows a schematic representation of the principal idea of the invention wherein a plurality of stations is connected to a common transmission medium; Fig. 2 shows in schematic form a system for connecting subscribers through a central office using space radio transmission; Fig. 3 shows one possible allocation of frequencies for a multi-channel exchange system; Fig. 4 shows a subscriber station arrangement which may be used in an automatic system similar to that of Fig. 2; Fig. 5 shows a modulating device which may be used in various applications of the invention; Fig. 6 shows an automatic central office arrangement which may be used in connection with the subscriber station of Fig. 4; Fig. 7 shows another subscriber's station arrangement for the system of Fig. 2; Fig. 8 shows a method of channel selection alternative to that employed in Fig. 7; Fig. 9 shows a central office arrangement which provides automatic interconnection between subscriber stations of the type shown in Fig. 7; Fig. 10 shows a frequency adjusting mechanism which may be used in the arrangement of Fig. 9; Fig. 11 shows a method of channel selection which may be used in place of that of Fig. 10; Fig. 12 shows another central office arrangement for automatically interconnecting subscriber stations of the type shown in Fig. 4; Fig. 13 shows still another central office arrangement for automatically interconnecting subscribers, the connection in this instance being accomplished at carrier frequencies; Fig. 14 shows an antenna arrangement for use in systems of the type described; Fig. 15 is a schematic diagram indicating how connections between stations in different areas may be completed through central stations over trunk circuits; and Fig. 16 is a schematic diagram of a guiding or conducting network which is available in common to a central station and a number of individual stations.

Referring to Fig. 1, there is illustrated one of the principal aspects of the invention. In this figure is shown a common medium CM, to which are connected a plurality of stations $S_1$, $S_2$, $S_3$, etc., each of which includes transmitting, receiving and associated apparatus. This apparatus, which will be hereinafter described, is arranged to permit intercommunication between different pairs of stations over the common medium CM employing different frequency bands to permit simultaneous communication between different pairs of stations. Connection between any pair of stations, for example, $S_1$ and $S_3$ takes place through the common central station CS which is also connected to the common medium CM.

Fig. 2 shows in schematic form a telephone exchange system in which a number of subscribers may be interconnected through a central office, the connection between each subscriber and the central office being accomplished by radio transmission through space. Each subscriber is provided with transmitting apparatus including an oscillator-modulator and receiving apparatus including a demodulator, together with the necessary selecting circuits. At the central office a plurality of circuits such as the one shown are provided for interconnecting between subscribers. Each connecting circuit includes two separate sets of apparatus, each of which comprises a radio transmitter and receiver, and a circuit between the two sets of apparatus including automatic means for completing the connection.

Transmission from subscriber A to subscriber B is effected by means of the transmitter $ST_1$, the oscillator-modulator $SM_1$, the tuned circuit or filter $SF_1$, the antenna $SA_1$, the antenna $OA_1$, the tuned circuit or filter $OF_1$, the demodulator $OD_1$, the hybrid coil $OH_1$, the connecting circuit CC (including the automatic switching apparatus AS), the hybrid coil $OH_2$, the oscillator-modulator $OM_2$, the tuned circuit or filter $OF_4$, the antenna $OA_2$, the antenna $SA_2$, the tuned circuit or filter $SF_4$, the demodulator $SD_2$ and the receiver $SR_2$. Transmission in the opposite direction is accomplished in an analogous manner, employing the transmitter $ST_2$, the oscillator-modulator $SM_2$, the selecting circuit $SF_3$, the antenna $SA_2$, the antenna $OA_2$, the selecting circuit $OF_3$, the demodulator $OD_2$, the hybrid coil $OH_2$, the connecting circuit CC, the hybrid coil $OH_1$, the oscillator-modulator $OM_1$, the selecting circuit $OF_2$, the antenna $OA_1$, the antenna $SA_1$, the selecting circuit $SF_2$, the demodulator $SD_1$ and the receiver $SR_1$.

It is proposed that different frequencies be employed for the oppositely directed transmissions in Fig. 2 and that the frequencies employed between the calling subscriber and the central office be different from those used between the central office and the called subscriber. Transmission might be on either a double or a single sideband basis with the carrier frequency transmitted.

In order that simultaneous conversations may take place between a number of pairs of subscribers, it is necessary that the frequencies employed in the system of Fig. 2 be properly selected. One way of arranging the frequencies would be to assign to each subscriber a separate pair of frequencies, one for transmitting and one for receiving, and to provide apparatus at the central office for receiving and transmitting the various required frequencies. Thus, subscriber A might be assigned a transmitting frequency $f_1$ and a receiving frequency $f_2$ and subscriber B transmitting and receiving frequencies $f_3$ and $f_4$, respectively. This would mean that in Fig. 2 the modulators $SM_1$ and $SM_2$ would operate with carrier frequencies $f_1$ and $f_3$, respectively, and the modulators $OM_1$ and $OM_2$ with carrier frequencies $f_2$ and $f_4$, respectively.

With such a scheme it might prove desirable, in order to facilitate the allocation of frequencies and the interconnecting of subscribers, to have a constant difference between the transmitting and receiving frequencies of each subscriber or, in other words, to make $$f_1 - f_2 = f_3 - f_4 = D \qquad (1)$$

The frequencies $f_1$, $f_3$, etc., might then be grouped in one part of the frequency spectrum and the frequencies $f_2$, $f_4$, etc., in another part. A diagram of a frequency allocation of this sort, assuming a total of 99 subscribers, is given in Fig. 3. It will be noted that the order of the frequency assignments corresponds to that of the subscriber numbers. This scheme, while not essential to all embodiments of the invention, is a very desirable feature in many.

Detailed arrangements of apparatus which might be used at the subscriber's station and at the central office in a scheme of this sort are illustrated in Figs. 4 and 6. While some of the apparatus shown in these and succeeding figures is more particularly adapted to radio frequencies lying below the ultra short-wave range, it will be understood that such apparatus is shown merely to illustrate the principles of the invention, and is not intended in any way to limit its scope.

The operation of the subscriber's apparatus illustrated in Fig. 4 is as follows: When the subscriber desires to make a call, the receiver $SR_1$ is removed from the switchhook SH. Through the contacts of the switchhook this closes a circuit which furnishes power supply to operate the oscillator and modulator OC and MO. The operation of the switchhook also provides D. C. supply for the transmitter $ST_1$, this supply being derived through a rectifier RF which is connected to the A. C. supply. The speech currents produced in the transmitter, after passing through the transformer $TR_1$, are modulated upon the assigned frequency, here assumed to be $f_1$. The oscillator and modulator may be separate units of any desired types, or a self-oscillating modulator might be used. The carrier and sidebands in the modulator output, after passing through the selecting circuit $SF_1$, are radiated by the antenna $SA_1$ to the central office. The subscriber now dials by means of the dial DI the number of the called subscriber, the dial DI interrupting his carrier supply in accordance with the number dialed. Communication is thereby established through the central office in a manner hereinafter to be described.

In the case of an incoming call, the carrier frequency $f_2$ and its associated sidebands are received by the antenna $SA_1$, selected by the selecting circuit $SF_2$ and demodulated by the demodulator $SD_1$. This demodulator may be of the vacuum tube type, in which case it should be kept always in operating condition so that a call may be received. Preferably, however, the demodulator might comprise some passive element or elements, as, for example, copper-oxide units as shown in Fig. 5. Associated with the demodulator is a relay $RL_1$ which is operated by the rectified current resulting from the incoming carrier frequency and which in turn operates the call bell SB. When the subscriber answers the call, the switchhook SH is operated, which, in addition to completing the contacts previously mentioned, operates the slow-release relay $RL_2$, which breaks the circuit of the bell SB. The received voice frequency currents, after passing through the transformer $TR_2$, are applied to the receiver $SR_1$ and two-way communication is thus established. If desired, a low pass filter LP (shown dotted in Fig. 4) may be included in the receiver circuit to suppress unwanted high frequency components in the demodulator output. It will be understood that a similar filter may be provided in the arrangements hereinafter described. When the subscriber hangs up, the slow-release feature of $RL_2$ prevents his bell from ringing before the other party also hangs up.

It will be noted that the filters $SF_1$ and $SF_2$ in Fig. 4 are arranged to select a fixed frequency. Consequently with the exception of one switchhook contact there will be no switched contacts in the transmission path of the subscriber's apparatus of Fig. 4. The switchhook contact may be readily avoided by replacing the connection through the switchhook by a permanent connection to the rectifier RF as shown by the dotted line $y$—$y$. In this case the connection at the point $x$—$x$ should be broken.

An automatic central office arrangement employing voice frequency interconnection and designed to work with the subscriber's station arrangement shown in Fig. 4 is diagrammatically illustrated in Fig. 6. The automatic switching equipment shown in the center of Fig. 6 comprises rotary switching devices and associated relays of the type commonly used in step-by-step systems. While the arrangement as shown is designed to provide automatic interconnection between a total of 99 subscribers, it will be apparent when this arrangement has been described that its subscriber capacity may be increased by the application of methods familiar to those skilled in the automatic switching art.

The operation of the arrangement of Fig. 6 will now be explained. It is assumed that a separate pair of frequencies is assigned to each subscriber, one for transmitting and one for receiving and that apparatus is provided at the central office for transmitting and receiving the various frequencies assigned to the subscribers.

The incoming carrier frequency of a calling subscriber is received by the antenna $OA_3$, selected by the selecting circuit $OF_1$, and demodulated by the demodulator $OD_1$. The direct current resulting from the rectifying action of the demodulator, after passing through the inductances $BI_1$, energizes the line relay LR which is associated with the rotary line switch $SU_1$. The function of this line switch is to find an idle connector with which to establish connection to the called subscriber. Thus the line switch makes it possible to operate with a number of connectors which is very much less than the total number of subscribers.

As shown in Fig. 6, the switching unit $SU_1$ comprises five adjacent rows of contacts together with five double-ended wipers, all of which are rotated by the stepping magnet $MM_1$. Each row is shown as including a total of ten contacts arranged in a semi-circle. The circuit thru which the line relay LR, which is of the slow-release type, is energized by the current resulting from the incoming carrier frequency, may be traced from the upper of the inductances $BI_1$ through a back contact of the cutoff relay $COR_1$, the winding of the relay LR, another back contact of $COR_1$, and thence to the lower of the inductances $BI_1$. If, when LR operates, the contacts of the line switch $SU_1$ are connected to an idle connector, there will be no ground on the contact in the row $s_1$ of switch $SU_1$. Then the operation of LR closes a circuit from ground through a make contact of LR, the winding of $COR_1$, the break contact of the stepping magnet $MM_1$, and the winding of $MM_1$ to battery.

It must be noted that there is a mechanical relation between the armatures of the relay LR and the relay $COR_1$, such that the relay $COR_1$ can become fully operated only if it is energized when LR is operated, whereas if LR is not operated when $COR_1$ is energized, $COR_1$ opens its break contacts but does not close its make contacts (with one exception as noted below.)

Thus the relay $COR_1$ is fully operated when the subscriber is initiating a call, and in this case completes the connection to the connector, but when the subscriber's line is made busy by an incoming call $COR_1$ pulls up only part way.

The operation of relay LR therefore serves to operate $COR_1$ completely. The stepping magnet $MM_1$ is so designed that it will not pull up when in series with $COR_1$ so that the wipers of the switch $SU_1$ remain in position. The operation of $COR_1$ connects the D. C. circuit from the demodulator through make contacts of $COR_1$ and contacts in the rows $s_2$ and $s_3$ to the connector CM. The operation of $COR_1$ also cuts off the relay LR. Since relay LR is slow-acting, however, it holds up for a fraction of a second, thus placing a temporary ground on the contact in the row $s_1$ until the relays in the connector CM shall have had time to pull up and place a permanent ground on this contact.

In addition, the operation of $COR_1$ connects one end of the voice frequency hybrid coil $OH_1$ through make contacts of $COR_1$ and contacts in rows $s_4$ and $s_5$ to the connector CM. The hybrid coil $OH_1$ is connected also to rows $s_2$ and $s_3$ of the switch $SU_4$ whereby incoming calls are connected to the line of the calling party. The operation of $COR_1$ also connects power supply to the oscillator-modulator $OM_1$. The relay $COR_1$ is so designed that the make-contact which connects the power supply to the oscillator-modulator is independent of the condition of the relay LR at the time $COR_1$ is energized.

Let us now assume the case where the wiper of the row $s_1$ or $SU_1$ is resting on a contact leading to a busy connector at the time the subscriber's receiver is lifted from the hook. Under this condition a circuit may be traced from the grounded $s_1$ contact through a back contact of the relay $COR_1$, a make contact of LR, the break contact of $MM_1$ and through the winding of $MM_1$ to the ungrounded side of the battery. This path is in effect a shunt around the winding of $COR_1$ and the stepping magnet will pull up and advance all wipers one step. As $MM_1$ pulls up it breaks its own circuit. If the connector for the new step is busy, $MM_1$ will operate again and continue to do so until it finds an idle connector. When an idle connector is found, the connection is completed through to the connector in the manner outlined above.

The connector CM, comprises a number of relays associated with two rotary switching units SU$_2$ and SU$_3$ similar to SU$_1$. The switching unit SU$_2$ comprises four adjacent rows of contacts with four wipers rotated by the stepping magnet MM$_2$, while the switching unit SU$_3$ comprises four rows of contacts and four wipers operated by the stepping magnet MM$_3$. Each row of contacts includes ten off-normal contacts and a normal contact.

The operation of the connector CM in Fig. 6 will now be explained. When the switch SU$_1$ has completed its connections, the rectified current from the demodulator OD$_1$ energizes the relay FR over a path through a contact in the row $s_2$ of SU$_1$, the winding of FR, and a contact in the row $s_3$ of SU$_1$. The operation of FR closes a circuit from ground through the make contact of FR and the winding of the slow release relay RR to battery, so that RR is operated. This closes a circuit through a make contact of RR which places a ground on the contact in the row $s_1$ of the switch SU$_1$ thereby marking the connector CM as busy and preventing its selection by another line switch. The same ground is also brought through the make-contact of the relay COR$_1$ to the contact in the row $s_1$ of the switch SU$_4$ of the connector to which the calling subscriber is permanently connected. This makes the calling subscriber's line busy for incoming calls.

The operation of RR also closes a circuit through two of its make contacts (with one side passing through contacts $a$ and $b$ of the off-normal springs ONS) whereby dial tone is transmitted back through the contacts in rows $s_4$ and $s_5$ of SU$_1$, the make contacts of COR$_1$ and thence to the hybrid OH$_1$. The dial tone is modulated in the oscillator-modulator OM$_1$ and received at the calling subscriber's station, thereby informing him that the central office apparatus is in readiness for him to dial the number of the called party. Let us suppose, for example, that this number is 34. The dialing of this number by the calling subscriber will produce a set of three interruptions of his carrier frequency followed by a set of four interruptions. At the central office the energy supply to the relay FR will first be interrupted three times in rapid succession. The deenergizing of FR will break the circuit of RR. Since the latter is a slow-release relay it will continue to hold until FR pulls up again.

When the armature of the relay FR falls back at the first break, it closes a circuit through its break contact, a make contact of RR, the contacts $e$ and $c$ on the off-normal springs, the winding of the slow-release relay SR and the stepping magnet MM$_2$. Hence the relay SR pulls up and at the same time the stepping magnet MM$_2$ operates to advance the wipers of the switch SU$_2$ by one step. This opens the contacts $a$ and $b$ of the off-normal springs, thereby stopping the transmission of the dial tone.

The circuit through the relay SR and the stepping magnet MM$_2$ is immediately broken by the reenergizing of the relay FR after the first "break impulse". The stepping magnet MM$_2$ releases but since SR is a slow-release relay it holds until the next impulse. The second "break impulse" again deenergizes the relay FR and again closes the circuit through the relay SR and the stepping magnet MM$_2$. This time, however, the circuit is completed over a new path leading over the back contact of the relay FR, a make contact of the relay RR, contacts $e$ and $d$ of the off-normal springs (closed when the switch SU$_2$ was advanced one step), the make contact of the relay SR, the winding of relay SR and the stepping magnet MM$_2$. Thus the switch SU$_2$ is advanced another step. The third break impulse acts just as the second one did to advance the switch one more step.

After the third break impulse there will be a time interval before the dialing of the next digit so that the slow-release relay SR will be deenergized. This will break the circuit through this relay, so that when the second set of impulses arrives the stepping magnet MM$_2$ will be out of the circuit.

The first break impulse of the second series causes the relay FR to fall back and thereby closes a circuit from ground through the break contact of FR, the make contact of RR, the off-normal contacts $e$ and $d$, the break contact of relay SR, a break contact of relay BR and thence through two parallel circuits, one through the winding of the slow-release relay AR to battery and the other through a break contact of the relay WR and the stepping magnet MM$_3$ to battery. Thus the wipers of the switching unit SU$_3$ will all be advanced one position. The stepping magnet MM$_3$ will be deenergized at the end of the first break impulse, and the following three impulses will act each to advance the switch SU$_3$ by one step just as the first one. Consequently, at the conclusion of the dialing all the wipers of the switch SU$_2$ will be in position 3 and all those of the switch SU$_3$ in position 4.

At this point it is necessary to make a busy test and if the line is busy to notify the calling subscriber and if not busy to complete the connection and ring the desired party. These results are accomplished automatically. First, assume that the called line is busy. If so, its contact in the row $s_1$ of the switch SU$_3$ will be grounded. Since AR is a slow-release relay it will remain pulled up for an instant after the last "break impulse". At this time a circuit may be traced from ground in the row $s_1$ of SU$_3$ through a break contact of WR, a make contact of AR, another break contact of WR and the winding of the relay BR to battery. Thus relay BR is pulled up, whereupon it forms for itself a locking circuit which is independent of the ground at SU$_3$. This circuit leads from the ground on a make contact of RR, through a make contact of BR, a break contact of AR (which has deenergized by this time), a break contact of WR and through the winding of BR to battery.

The energizing of BR breaks the circuit of the stepping magnet MM$_3$ so that should the subscriber dial again while connected to the busy line the wipers of SU$_3$ would not be rotated so as to complete a wrong connection. Relay BR also serves to connect busy tone to the line of the calling subscriber through two of its make contacts. The busy tone will continue until the calling party hangs up. It should be noted that when the line is busy the wiper closing relay WR does not operate to connect the line through to the wipers of SU$_3$ so that there is no interference with the parties already using the line.

Now let us assume that the called line is idle and that the contact in row $s_1$ of SU$_3$ is not grounded. When relay AR deenergizes following the last impulse a circuit may be traced from ground, through a make contact of RR, a back contact of BR, the upper winding of WR, a back contact of AR, a back contact of WR, the contacts in the $s_1$ rows of switches SU$_2$ and SU$_3$ and thence through the called party's cutoff relay COR$_2$ and stepping magnet MM$_4$ to battery. As explained for COR₁ and MM₁, MM₄ does not pull up. This causes the relay WR to pull up sufficiently to close a make contact whereby WR forms for itself a locking circuit from ground through a make contact of RR, a make contact of WR and the lower winding of WR to battery. The closing of this circuit causes WR to pull up completely so that make contacts are closed to establish connections leading through the wipers of rows s₂ and s₃ of switches SU₂ and SU₃ to the hybrid coil OH₂ of the called party.

The operation of WR also acts to place a ground on the contact in the row s₁ of the switch SU₃, thereby making the called subscriber's line busy. A further result of the operation of WR is to break the circuit of the stepping magnet MM₃ so as to prevent any stepping due to further impulses which might come from the dial.

Another result of the operation of WR is to partially operate the cutoff relay COR₂, thereby connecting power supply to the oscillator-modulator OM₂ and ringing the called party by sending out his carrier frequency. It would also be possible in this arrangement to use the ordinary ringing current, modulating this upon the carrier frequency and receiving it at the subscriber's station.

When the called party answers, the circuit is in readiness for conversation. At the conclusion of the conversation the calling party by hanging up his receiver cuts off his carrier frequency which in turn deenergizes the relay FR of the connector. The release of FR interrupts the circuit of the slow-release relay RR which has remained closed during the conversation, so that R—R releases a moment later. This releases WR, which removes the ground from the s₁ rows of the switches. Also, the release of RR closes two circuits to ground through a back contact of RR. One of these circuits leads through the wiper of contact row s₄ of switching unit SU₂ to one of the off-normal contacts of this row and thence through a back contact of the stepping magnet MM₂ and the winding of this magnet. The other path leads similarly through the wiper of s₄ of switching unit SU₃ and off-normal contact of this row, a back contact of the stepping magnet MM₃ and the winding of this magnet. These circuits cause the switches SU₂ and SU₃ to buzz around until the normal contact position of each is reached. Thus the switches are placed in readiness for the next connection.

The arrangement of Fig. 6 thus provides automatic interconnection of subscribers at voice frequencies. However, it requires a separate modulator and demodulator and selecting circuits for each pair of subscribers' frequencies. In order to reduce the amount of apparatus required at the central office, various alternative methods of frequency allocation might be used in place of the one just described. In accordance with one such method, one pair of frequencies would be assigned to each subscriber for incoming calls. In addition, a number of pairs of frequencies equal to the maximum number of conversations that might be desired at any one time would be set aside for use by calling subscribers in reaching the central office. In placing a call, a subscriber would automatically select an idle pair of frequencies over which to establish connection to the central office at which point the frequencies of the called subscriber would be selected automatically and the connection completed. Details of apparatus which might be used at the subscriber's station and the central office for carrying out this method are shown in Figs. 7, 8 and 9.

The operation of the arangement shown in Fig. 7 is as follows: When the subscriber desires to make a call, he removes the receiver SR₁ from the switchhook SH. The operation of the switchhook provides D. C. supply for the transmitter ST₁ and power supply for the oscillator and modulator OC and MO. In addition, the operation of the switchhook energizes the slow-release relay RL₂ whose winding is connected to the D. C. supply through one of its own back contacts and back contacts of the relays RL₃ and RL₁. (At the time the switchhook is removed the relay RL₁ in the demodulator circuit is deenergized, since the demodulator is connected through one of the back contacts of the relay RL₃, which is also deenergized, to the fixed selecting circuit FF₂ which is used for incoming calls.) Relay RL₂ is a slow-release relay which remains pulled up during the entire selecting operation. The condenser RC which is bridged across the winding of RL₂ contributes toward the slow-release feature.

The operation of the relay RL₂ energizes the slow-release relay RL₃, which is connected through the make contact of RL₂, one of its own break contacts and the switchhook. The relay RL₃ in operating establishes for itself a new path direct through one of its own make contacts and the switchhook, so that this relay remains in operation until the receiver is replaced on the hook at the conclusion of the call.

The operation of the relay RL₃ serves to connect the modulator MO and the demodulator SD₁ through the selective switching apparatus SW to the variable selecting circuits VF₁ and VF₂, which in turn are connected to the antenna SA₁.

Before continuing with the description of the circuit operation, the selective switching apparatus SW will be described. This apparatus is of a type well known in automatic switching practice. It comprises in effect a rotary switching unit having seven adjacent rows or banks of contacts, s₁, s₂, etc., each row having ten contacts arranged in the form of a semi-circle, so that wipers may be operated step-by-step by the stepping magnet RL₅ to engage the various contacts in succession. A double-ended wiper is provided for each row of contacts so that switching takes place always in a forward direction. The different banks of contacts are all arranged to be operated from the same stepping magnet.

The variable filters VF₁ and VF₂ each comprise a T network which includes in each series arm a tapped condenser, such as TC₁, and a fixed inductance, such as FI₁. The shunt portion of each filter comprises in parallel a fixed condenser, such as FC₁, and a tapped inductance, such as TI₁. The tapped condensers TC₁ and TC₂ and the tapped inductance TI₁ are connected respectively to the banks of contacts s₁, s₃ and s₂ so that when the wipers of these banks are in any given position, the filter is adjusted to select a particular high frequency channel (passing both the carrier and its sidebands). The proportioning of the tapped condensers and inductance is such that the filter VF₁ is able to select any one of ten channels assigned for transmitting from the calling subscriber to the central office, while the filter VF₂ is able to select any one of ten channels assigned for transmitting from the central office to the calling subscriber. It will be understood that the showing of ten pairs of channels for establishing connection with the central office is purely arbitrary and that any other desired number might be provided instead, the total number being such as to accommodate the maximum number of conversations expected to take place simultaneously.

While it would be possible for the subscriber to select an idle pair of channels by manual adjustment, it is considered preferable to perform this selection automatically, and the switching apparatus SW, in combination with the variable filters $VF_1$ and $VF_2$, accomplishes this result. The method by which this selection is carried out will now be explained. If, when the relay $RL_3$ operates, the switching apparatus SW is connected to an idle pair of channels, the wipers of the switching unit remain in position, and the channel is used by the subscriber for obtaining his connection through the central office in a manner hereinafter to be described. If, however, at the time the relay $RL_3$ is operated, the switches are connected to a pair of channels already in use, a carrier frequency is received by the demodulator $SD_1$ and the resulting rectified current operates the relay $RL_1$. This completes a circuit through the winding of the relay $RL_4$, which is connected through a make contact of the relay $RL_1$, a make contact of the relay $RL_2$, and a back contact of the stepping magnet $RL_5$. The relay $RL_4$ through its make contact completes a circuit which energizes $RL_5$, and the operation of the stepping magnet $RL_5$ advances all wipers by one position.

The operation of the stepping magnet $RL_5$ also deenergizes the relay $RL_4$ which is connected through the back contact of $RL_5$. This in turn deenergizes $RL_5$. If at this time the switching unit is connected to an idle pair of channels, no further operation occurs and the subscriber is ready for communication with the central office. If, however, the connection has been made to another busy pair of channels, the relay $RL_4$ will operate as before, and the switching mechanism will be advanced another step, this operation being repeated until an idle pair of channels is found. The relay $RL_3$, being of the slow-release type, will not release during the channel selecting operation.

The selection of a pair of channels to the central office has served in addition to adjust the frequency of the subscriber's oscillator from the frequency normally used for answering incoming calls to the transmitting frequency corresponding to the outgoing channel selected. This adjustment is accomplished through the bank of contacts $s_7$ on the switching unit. The fixed condenser $FC_3$, which is connected across the plate winding of the oscillator coil, produces the frequency for answering incoming calls. The operation of the relay $RL_3$, however, connects the tapped condenser $TC_5$ across the plate winding instead, and the adjustment of this condenser is determined so that the frequency corresponds to that of the variable tuned circuits on each switching step.

Upon the completion of the channel selection the slow-release relay $RL_2$ releases, and this connects the carrier supply from the oscillator to the modulator through a back contact of $RL_2$. When the central office apparatus functions a dial tone modulated carrier frequency will be transmitted into the demodulator, pulling up the relay $RL_1$. The relay $RL_4$ does not operate now, however, since it is connected through a make contact of the relay $RL_2$, and no further stepping can occur.

Upon hearing the dial tone the subscriber dials by means of the dial $DI_1$ the called number thus producing interruptions of his transmitting carrier frequency and establishing the connections as will be hereinafter described.

The operation of the arrangement of Fig. 7 in receiving an incoming call will now be described. When the subscriber's receiver is on the switchhook, relay $RL_3$ is deenergized and the modulator and demodulator are connected through the back contacts of this relay to selecting circuits $FF_1$ and $FF_2$, which correspond to the pair of frequencies permanently assigned to the subscriber for incoming calls. The oscillator frequency is properly adjusted by the condenser $FC_3$.

The rectified current produced by the incoming carrier frequency operates the relay $RL_1$, closing the circuit of the bell SB, which is connected through one of the contacts of the switchhook. When the subscriber answers the call, the bell circuit is broken by the switchhook and the apparatus is in condition for conversation with the calling party.

It will be understood in connection with Fig. 7 that other switching or adjusting mechanisms might be employed for selecting an idle channel for use by the calling subscriber in reaching the central office.

It will also be understood that other types of variable selecting circuits and oscillator control schemes might be used in Fig. 7. Thus, for example, the tapped inductances and condensers of Fig. 7 might be replaced by a number of individual units of fixed inductance and capacity. An arrangement of this kind is described subsequently in connection with Fig. 10. Yet another possibility would be to use for the variable elements neither tapped units nor fixed individual units but continuously variable inductances and condensers whose value is controlled by the rotary switching mechanism in the manner indicated in the perspective drawing of Fig. 8. In this figure $VC_1$ and $VC_2$ designate variable condensers and $VI_1$ a variable inductance, all of which are mounted on a shaft which is rotated by the stepping magnet $RL_5$ as operated by the circuit arrangement of Fig. 7. These are connected to fixed inductances $FI_1$ and $FI_2$ and the fixed condenser $FC_1$ to form a variable filter equivalent to the filter $VF_1$ in Fig. 7. It will be understood that all of the variable inductances and condensers required might be either mounted on or connected to a common shaft, and that the banks of switch contacts shown in Fig. 7 would thereby be rendered unnecessary. It will be understood also that the adjustable or variable inductances and capacitances as described might be employed in other types of selecting circuits.

The central office apparatus to provide automatic interconnection for the frequency allocation scheme just described, is illustrated in Fig. 9. This arrangement is similar to that of Fig. 6 except that (1) in Fig. 9 no line switch is needed for finding an idle connector since one connector is permanently associated with each set of apparatus used to receive an incoming call, (2) in Fig. 9 the rotary switches do not complete the connection but serve to adjust the frequencies of the apparatus at one end of the connection to the frequencies assigned to the called party, and (3)

the connection is made on a 4-wire instead of a 2-wire basis.

The similarity of operation of the arrangement of Fig. 9 to that of Fig. 6 is so close that duplication may be avoided in many instances by giving only a brief description in connection with Fig. 9, it being understood that the complete tracing of circuit details may be obtained by reference to the description of Fig. 6.

Referring to Fig. 9, the call which comes in on the channel selected by the subscriber is received at the central office by the appropriate selecting circuit $OF_1$ and demodulator $OD_1$. The rectified carrier current now directly energizes the relay FR of the connector. This operates the relay RR which connects power supply to the oscillator-modulator $OM_1$ and sends dial tone to the calling subscriber, informing him that he may proceed to dial the desired number.

The interruptions of the carrier frequency which correspond to the first digit of the number operate the stepping magnet $MM_2$ and advance the wipers of the switch $SU_2$. When the second set of interruptions arrives, the stepping magnet $MM_2$ is out of the circuit, and $MM_3$ is operated to advance the wipers of the switch $SU_3$. Hence at the conclusion of the dialing, the wipers of switches $SU_2$ and $SU_3$ will be in positions which correspond to the number of the called party.

This adjustment of switches $SU_2$ and $SU_3$ accomplishes these results: (1) it sets the response frequency of the variable selecting circuit $VF_2$ at the transmitting frequency assigned to the called party and at the same time (2) it brings the oscillator $OO_2$ and the variable selecting circuit $VF_1$ to the receiving frequency assigned to the called party. The adjustment of the frequency of $VF_2$, $OO_2$ and $VF_1$ is governed by rows $s_2$, $s_3$ and $s_4$, respectively, of switches $SU_2$ and $SU_3$. It may be accomplished by a frequency controlling arrangement similar to that of Fig. 7 or by an arrangement described in connection with Figs. 10 and 11.

At this point it is necessary to determine whether the called party's frequencies are busy and, if so, to notify the calling subscriber or, if not, to complete the connection. First, assume that another connection is already established with the called subscriber, so that his frequencies are already in use. If so, there will be a ground at the subscriber's contact in row $s_1$ of the switch $SU_3$. At this time a circuit may be traced from the ground at switch $SU_3$ through a break contact of WR, a make contact of AR (which has not yet released), another break contact of WR, and the winding of the relay BR to battery. Thus, relay BR is pulled up, whereupon it forms for itself a locking circuit which is independent of the ground at $SU_3$. This circuit leads from the ground on a make contact of RR through a make contact of BR, a break contact of AR (which has deenergized by this time), a break contact of WR and through the winding of BR to battery.

The operation of BR serves to connect busy tone to the line leading back to the calling subscriber, this tone continuing until the calling party hangs up.

Now let us assume that the frequencies of the called party are not in use at the time the switches $SU_2$ and $SU_3$ arrive at the number of the called party. Then the ground connection will not be established at $SU_3$ and the circuit through WR will cause that relay to pull up sufficiently to close a make contact whereby WR forms for itself a locking circuit which pulls it up completely. The operation of WR closes a make contact which connects power supply to the oscillator $OO_2$ and the modulator $OM_2$, thus ringing the called party. The operation of WR also places a ground on the subscriber's contact in row $s_1$ of $SU_3$.

When the called party answers, the circuit is in readiness for conversation. At the conclusion of the conversation, the called party by hanging up cuts off his carrier frequency which deenergizes the relay FR of the connector, and this in turn causes RR to release. At this time two circuits are closed to ground through a back contact of RR. One of these circuits leads through contact row $s_5$ of the switching unit $SU_2$ to the off-normal contacts of this row and thence through a back contact of $MM_2$ and the winding of $MM_2$. The other path leads similarly through row $s_5$ of $SU_3$, a back contact of $MM_3$ and the winding of $MM_3$. These circuits cause the switches $SU_2$ and $SU_3$ to buzz around until the normal contact position of each is reached, whereupon the switches are in readiness for the next connection.

Details of one possible arrangement whereby the frequencies of $VF_2$, $OO_2$ and $VF_1$, of Fig. 9 may be automatically adjusted are shown in Fig. 10. Referring to Fig. 10 the apparatus CM' (included within the dotted lines) is intended to be substituted in Fig. 9 for the rows of contacts and associated wipers $S_2$, $S_3$ and $S_4$ of the switching units $SU_2$ and $SU_3$, and the selecting circuits $VF_2$, $OO_2$ and $VF_1$. It will be seen, therefore that the seven rows of contacts and associated wipers $S_1'$ to $S_7'$ of $SU_2'$ replace the three rows of contacts and wipers $S_2$ to $S_4$ of $SU_2$. Similarly, the rows of contacts and wipers of $SU_3'$ replace $S_2$ to $S_4$ of $SU_3$. The wipers $S_1'$ to $S_7'$ of $SU_2'$ and $SU_3'$ will now rotate simultaneously with wipers $S_1$ and $S_5$ of $SU_2$ and $SU_3$ under the control of the stepping magnets $MM_2$ and $MM_3$. The positions taken by these wipers upon completion of the dialing process will, as explained in connection with Fig. 9, correspond to the called subscriber's number.

The connections of the various rows of contacts $s_1'$, $s_2'$, $s_3'$, etc., of the switching units $SU_2'$ and $SU_3'$ will now be explained. Two variable band filters somewhat similar to those used in the subscriber's station arrangement of Fig. 7 are employed. Each band filter comprises a T network which includes in each series arm a fixed inductance and a capacity whose value depends upon the position of the wipers of the switching units $SU_2'$ and $SU_3'$. The shunt part of the T network comprises a fixed condenser connected in parallel with an inductance whose value is determined by the switch position. One side of the filter is connected through the switch contacts to the antenna, while the other is connected to the modulator or demodulator, as the case may be.

The fixed and the adjustable elements of each filter are so designed that when the switching units are in the appropriate position the transmitting and receiving channels of the called subscriber are selected. It will be seen also that the position of the switching units determines the frequency of the oscillator $OO_2$ through the selection of a capacity value by the contact rows $s_7'$.

Since frequency is ordinarily an inverse function of inductance and capacity, if the subscribers' frequencies are arranged in the same order as the switch positions (and call numbers), the values of capacity and inductance associated with the switching units should be arranged in an order of magnitude inverse to the switch position numbers. The steps of inductance and capacity on switching unit SU$_3$' should be approximately one-tenth of those on unit SU$_2$'. If the capacity and inductance values differ by uniform intervals, the frequencies will evidently be separated by non-uniform intervals.

Since the wipers of SU$_2$' and SU$_3$' are arranged to operate with wipers S$_1$ and S$_5$ of the units SU$_2$ and SU$_3$, they will also buzz around to the "normal" contact positions at the completion of the connection. Thus, the arrangement is placed in readiness for the next connection.

If desired, tapped inductances and condensers similar to those used in Fig. 7 might be employed in place of the indivdual condenser and inductance units associated with the switching steps in Fig. 10.

Another possibility would be to derive the desired values of inductance and capacitance for Fig. 9 from variable condensers and inductances which might either be mounted directly on the shafts of the switching units or controlled by them. For this purpose the condensers and inductances to be controlled by the stepping magnet MM$_2$ may be mounted on a common shaft which is provided with a wiper traversing an annular ring. This is shown in the perspective drawing of Fig. 11. The condensers and inductances to be controlled by the stepping magnet MM$_3$ are similarly shown mounted on another shaft. The condensers and inductances controlled by MM$_2$ may have values approximately ten times those of the condensers and inductances controlled by MM$_3$. The corresponding units on the two shafts may be suitably connected together and to other units to form selecting circuits VF$_1$, VF$_2$ and OO$_2$ of Fig. 9.

Referring to Fig. 11 in response to the stepping magnet MM$_2$ the shaft is stepped around to a position corresponding to the first digit of the desired number thus adjusting the values of the inductance VI$_1$ and the condenser VC$_1$. The first 180° of rotation of the shaft covers the useful range of the circuit elements. Since these elements are continuously variable any number of positions may be included in this range. The number of teeth on the ratchet RA$_1$ should therefore be twice the number of positions employed. For ten digits the ratchet should have 20 teeth.

When the connection is taken down, a circuit is completed through the stepping magnet and its back contact, the wiper and annular ring, and the back contact of the release relay to ground. This completes the revolution of the shaft around to the starting point where an insulated segment breaks the circuit. The mechanism is now in readiness for the next operation.

It will be understood, of course, that other known types of tuned circuits may be employed in place of the single section band filters shown in Fig. 10.

While the arrangements shown are designed to care for a maximum of 99 subscribers, it will be evident that the capacity may be increased by methods familiar to those skilled in the automatic switching art.

It should be noted in connection with the arrangement of Fig. 9 that, if the shift of frequency of the variable tuned circuits VF$_1$ and VF$_2$ does not require switched contacts in the talking connection (which will be the case if the frequency adjusting method of Fig. 11 is employed), the complete central office talking connection between subscribers involves no switched contacts whatever. This is in marked contrast to existing types of automatic switching connections, in which the number of contacts included in the central office talking connection may range from around 30 to 40 or 50. In fact, even an ordinary manual connection may include a dozen or more contacts. It is well known that such a multiplicity of contacts in a central office connection is very undesirable since it gives rise to noise on the talking circuit, such noise including not only "clicks" and "bats" at the time the connections are completed, but frequently also continued noise due to varying contact resistance. The arrangement of Fig. 9 avoids these difficulties by employing frequency shift as the basis for establishing the connection. The central office arrangements described in connection with Fig. 6, while not avoiding all contacts at the central office, nevertheless reduce the number of such contacts materially below that for the ordinary central office interconnection. This feature of avoiding switched contacts constitutes one of the important features of the invention.

Since the central office arrangement of Fig. 9 requires a rather complicated arrangement at the subscribers' premises, another automatic arrangement will now be described. Again in this case a pair of channels is permanently assigned to each subscriber, one for transmitting and one for receiving. The central office apparatus is arranged so that a call coming in at any assigned frequency is automatically picked up and the connection completed when the calling subscriber dials the number he desires.

A central office connecting arrangement for this purpose is illustrated in Fig. 12. This arrangement is designed to work with the subscriber's station arrangement of Fig. 4. A number of connecting devices as per Fig. 12 would usually be provided at an office.

Referring to Fig. 12, the incoming frequencies of calling subscribers are received by the antenna OA$_3$ and delivered to the selecting circuit OF$_1$ whose frequency of response is being continuously varied by the driving motor DM$_0$. The same motor also varies the frequency of the selecting circuit OF$_2$ which is associated with the modulator OM$_1$ and the frequency of the oscillator OO$_1$ which furnishes carrier supply to this modulator. The assignment of frequencies to subscribers is made upon the basis of Equation 1; that is to say, there is a constant difference between the transmitting and receiving frequencies to each subscriber. The adjustment of the frequencies of OO$_1$ and OF$_2$ is so arranged that when the selecting circuit OF$_1$ is adjusted to a particular incoming frequency, OO$_1$ and OF$_2$ are set for the corresponding outgoing frequency.

The motor DM$_0$ also rotates the rotary switch or commuator SW$_0$, which is provided with a number of contacts, one for each subscriber whose incoming frequency may be selected by the selecting circuit OF$_1$. The switch is arranged so that the contact corresponding to any given subscriber is made at the same moment that the frequency of that subscriber is picked out by OF$_1$.

The operation of the arrangement of Fig. 12 in response to an incoming call will now be described. The carrier frequency of the incoming call is selected momentarily by OF$_1$ and rectified in the demodulator OD$_1$. If at this time another incoming mechanism similar to that of Fig. 12 has already established a connection with the calling subscriber, there will be a ground on the proper contact of the switch SW$_0$. The method of establishing this ground will be described later. This ground completes a circuit through the winding of relay XR and a back contact of relay RR thus operating XR and interrupting the circuit bringing rectified current from the demodulator $OD_1$ to the initial relay FR of the connecting mechanism.

Assuming that a connection has not been established and there is no ground at $SW_0$, the rectified carrier current will energize the relay FR and this in turn will operate the relay RR. The operation of RR in turn operates the slow-release relay YR, which interrupts the power supply to the driving motor $DM_0$, thereby stopping the driving mechanism for the duration of the call. In addition, RR connects power supply to the oscillator and modulator $OO_1$ and $OM_1$. The operation of RR also connects a ground to the subscriber's contact on the rotary switch $SW_0$, thereby preventing another connecting mechanism from picking up the same call. The operation of RR also sends dial tone to the calling subscriber, informing him that he may proceed to dial the number he desires.

The interruptions which correspond to the first digit of the number operate the stepping magnet $MM_2$ and advance the wipers of the switch $SU_2$. When the second set of interruptions arrives, the stepping magnet $MM_2$ is out of the circuit and $MM_3$ is operated to advance the wipers of the switch $SU_3$. Hence, at the conclusion of the dialing, the wipers of switches $SU_2$ and $SU_3$ will be in positions which correspond to the number of the called party.

The adjustment of switches $SU_2$ and $SU_3$ accomplishes the same results as in the case of Fig. 9, namely, (1) it sets the response frequency of the variable selecting circuit $VF_2$ at the transmitting frequency assigned to the called party and (2) it brings the oscillator $OO_2$ and the variable selecting circuit $VF_1$ to the receiving frequency assigned to the called party.

The determination of whether the called party's frequencies are busy is accomplished in the same manner as in Fig. 9. In case the called subscriber's frequencies are not busy the connection is completed by the operation of the relay WR, which connects power supply to the oscillator $OO_2$ and the modulator $OM_2$, and also places a ground on the line of the called subscriber in the row $s_1$ of the switch $SU_3$.

At the conclusion of the conversation the calling party by hanging up cuts off his carrier frequency which deenergizes the relay FR and causes the relay RR to release. The switches then return to normal and the mechanism is in readiness to complete the next connection. When the relay YR releases, the mechanism resumes its hunting for an incoming call.

It is apparent that the arrangement of Fig. 12 permits the employment of a relatively simple arrangement at the subscriber's station, inasmuch as the frequencies used by the subscriber are always the same. The arrangement at the central office is somewhat complicated, but the number of switching circuits required will be only a small fraction of the total number of subscribers.

In addition to the several methods of frequency allocation which have been described in connection with Figs. 4 to 12, inclusive, various other schemes might be employed. One possibility, for example, might be to assign a number of carrier frequencies over which the subscriber might reach the central office. This would be done by the dialing of the subscriber's own number, thereby interrupting the carrier frequency. This dialing of the subscriber's number might be used to adjust the apparatus at the central office to the pair of frequencies permanently assigned to the calling subscriber. A second dialing of the number of the called party would then adjust the central office apparatus on the outgoing side to the frequencies assigned to the called subscriber. Yet other arrangements might be devised which employ the principles which have already been disclosed but differ in detail from the arrangements described.

In all of the arrangements described thus far, the central office connection between subscribers has been effected at voice frequencies. It is possible, however, to interconnect the subscribers without bringing the signals down to voice frequencies. Fig. 13 shows an arrangement for automatic interconnection at high frequencies. This arrangement is designed for use in conjunction with the subscriber's station arrangement of Fig. 4.

It will be seen that Fig. 13 is quite similar to Fig. 9, so that an abbreviated description of the function of the arrangement of Fig. 13 will suffice. As in the case of Fig. 9, it is assumed in connection with Fig. 13 that each subscriber is assigned a separate pair of frequencies for incoming calls, and that in addition a number of pairs of frequencies are set aside for use by subscribers in placing outgoing calls.

Referring to Fig. 13, the call which comes in on the channel selected by the subscriber is received at the central office by the appropriate selecting circuit $OF_1$. Across the output of this selecting circuit there is connected the rectifier RF whose output energizes the relay FR of the connecting mechanism. The operation of FR closes the slow-release relay RR which sends dial tone to the calling subscriber informing him that he may proceed to dial the desired number. In this case, however, the dial tone is furnished by means of two (or more) frequencies, one of which is the carrier frequency of the selecting circuit $OF_2$, i. e., the frequency for transmission from the central office to the calling subscriber, while the other frequency (or frequencies) differs from this carrier frequency by whatever amount is desired for the dial tone.

The calling subscriber on hearing the dial tone proceeds to dial the desired number. The interruptions which correspond to the first digit of the number operate the stepping magnet $MM_2$ and advance the wipers of the rotary switch $SU_2$. A second set of interruptions operates the stepping magnet $MM_3$ and advances the wipers of the rotary switch $SU_3$. Consequently, at the end of the dialing process the wipers of switches $SU_2$ and $SU_3$ are in positions corresponding to the number of the called party.

The adjustment of the switches $SU_2$ and $SU_3$ (1) adjusts the response frequency of the variable selecting circuit $VF_2$ to the transmitting frequency assigned to the called party, (2) adjusts the response frequency of the variable selecting circuit $VF_1$ to the receiving frequency assigned to the called party, (3) adjusts the frequency of the oscillator $OO_1$ to the difference between the frequencies of the selecting circuits $OF_1$ and $VF_1$, i. e., the difference between the transmitting frequency selected by the calling party and the receiving frequency of the called party, (4) adjusts the frequency of the oscillator $OO_2$ to the difference between the frequencies of the selecting circuits $VF_2$ and $OF_2$, i. e., the difference between the transmitting frequency of the called party and the receiving frequency selected by the calling party. The frequencies required under (3) and (4) are known since the frequencies selected by the calling subscriber are known (being the mid-frequencies of the fixed selecting circuits $OF_1$ and $OF_2$) and the frequencies of the called subscriber are determined from the number which is dialed. The adjustment of the various frequencies may be accomplished by one of the methods already described.

The determination of whether the called party's frequencies are busy is accomplished in the same manner as in Fig. 6. If these frequencies are busy, the relay BR operates and sends a busy tone back to the calling subscriber. This "busy tone" is furnished by a combination of the appropriate carrier frequency and one or more other frequencies. In case the frequencies of the called party are not busy, the connection is completed by the operation of the relay WR, which connects power supply to the oscillations $OO_1$ and $OO_2$ and the modulators $OM_1$ and $OM_2$. The operation of WR also connects a ground to the contact of the called subscriber in the row $s_1$ of the switch $SU_3$.

At the conclusion of the conversation the calling party by hanging up cuts off his carrier frequency which deenergizes FR and causes RR to release. The switches then return to normal and the mechanism is in readiness to complete the next connection.

It will be noted that in the case of Fig. 12 and Fig. 13, just as in that of Fig. 9, it is possible, by methods already described, to arrange the central office connection so that it includes no switched contacts in the signaling path. Furthermore, the arrangements of Fig. 12 and Fig. 13 are designed to work with Fig. 4 which involves no switched contacts in the signaling path of the subscriber's station.

It is contemplated in accordance with the invention that subscribers' stations of the types described shall be associated in the same central office area with other subscribers' stations either of existing types or of types herein described and that all such subscribers' stations shall be interconnected through the central office. In general, such interconnections can be effected by appropriate types of connecting circuits.

The invention further contemplates that subscribers' stations of the types described above shall be located in different central office areas and interconnected both with one another and with other types of stations. The trunk circuits to be used for interconnection between central offices may be designed for either manual or automatic operation and may consist either of ordinary voice-frequency circuits or of high frequency channels derived from radio systems or guided wave transmission systems such as carrier systems. A type of automatic high frequency interoffice trunk adapted for such use is disclosed in U. S. Patent No. 1,619,228 to S. B. Williams, Jr. et al. Other suitable types of trunks are well known in the art.

In the various arrangements shown in Fig. 2 to Fig. 13 radio transmission between the subscribers and the central office may be accomplished directly using any suitable type of antenna. However, in order to permit the use of ultra-short waves, for which substantially line-of-sight projection may be desired, it may be necessary to carry the transmission path above any obstacles lying between the antennas of individual subscribers and the central office antenna. For this purpose an arrangement of the type shown in Fig. 14 might be employed.

Referring to Fig. 14 it will be seen that in this case a single central office antenna OA serves for receiving all frequencies from subscribers and transmitting all frequencies to subscribers. This antenna may be mounted on a tall building or tower so that substantially a line-of-sight transmission path is obtained between the central office and each subscriber's antenna within the central office area. The subscriber's antenna should preferably be designed for radiating a beam toward the central office antenna and for receiving radiation from that antenna. Thus the subscriber's antenna might be a balanced doublet SA as shown in Fig. 14, placed near the focus of a parabolic reflecting surface, PR, directed toward the central office antenna OA. The central office antenna, however, is designed for radiating to and receiving from all subscribers. For this purpose there might be employed an antenna capable of radiating in all directions and receiving radiations from all directions throughout the range of frequencies utilized. Such an antenna, for example, might be a balanced doublet OA as shown in Fig. 14. Another possibility would be to employ a central office antenna so designed that it is capable of radiating into and receiving from a conical space which comprehends all subscribers' locations. This might be accomplished by adding the reflector RE above the doublet antenna OA.

It is also contemplated that instead of employing a single central office antenna a multiple antenna arrangement might be used at the central office building, each antenna being designed for handling a part of the total range of frequencies. It would also be possible to employ two antennas for each subscriber instead of one.

The arrangements described in connection with Figs. 2 to 13 are designed to provide a radio connection between the subscribers within a given area. It is proposed also to interconnect such stations with subscriber stations in other areas by providing in each area a central office, so that a radio connection may be established between a subscriber and his central office, using a frequency or frequencies assigned for that purpose, and the connection completed over suitable interoffice trunks. The method is illustrated schematically in Fig. 15. The central office apparatus to be used in carrying out this method might be patterned after that shown in Figs. 6, 9, 12 or 13. The types of trunks which may be used to interconnect the central offices are well known in the art.

In the arrangements thus far described with the exception of Fig. 1 it has been assumed that free space is employed as the common transmitting medium. It is contemplated, however, that transmission over a high frequency conducting or guiding path may be employed instead of radio transmission. Such a path would take the form of a network extending to all subscribers within a given area and to the central office for that area. A network of this kind is shown schematically in Fig. 16 where each line represents a complete circuit, C designates the central office and S a subscriber's station.

Probably the simplest form of such a network would be one composed of ordinary two-conductor circuits suitably interconnected and branched so that the common circuit will be available at all desired points. The circuits constituting the network might, for example, consist of pairs of open wire or cable conductors.

It is contemplated also in accordance with the invention that the wire network employed for distributing light and power currents might be used as the common medium from which to derive high frequency channels for the telephone exchange system. The high frequency channels would be superposed upon the power network by carrier methods which are well known in the art.

Another form of transmission medium, and one which is peculiarly advantageous in that it is capable of transmitting a wide band of frequencies with comparatively low attenuation and which may be so shielded as to be practically immune to external disturbances, may be found in a network of circuits consisting of two conductors disposed coaxially with respect to one another. A circuit of this type has been disclosed in the patents to L. Espenschied and H. A. Affel, No. 1,835,031, December 8, 1931, H. A. Affel and E. I. Green, No. 1,781,092, November 11, 1930, etc.

As an alternative to the coaxial circuit, the high frequency transmission medium might comprise a network of circuits, each consisting of two parallel conductors surrounded by a shield. Circuits of this type are disclosed in the applications of Green, Curtis and Mead, Serial No. 674,762, Patent No. 2,034,032, Green and Curtis, Serial No. 674,763, Patent No. 2,034,033 and Green and Lieve, Serial No. 674,764, Patent No. 2,034,034, all filed June 7, 1933 and patented March 17, 1936.

The invention contemplates also utilizing as the high frequency transmission medium a dielectric wave guide comprising a cylindriform dielectric material which may or may not be surrounded by a conductor. Such dielectric guides are disclosed in the patent applications of G. C. Southworth, Serial No. 661,154, filed March 16, 1933, and Serial No. 701,711, filed December 9, 1933.

It is contemplated in accordance with the invention that the subscriber set and central office arrangements which have been described may be employed with any of the above types of transmission paths. For this purpose, it is necessary merely to substitute the transmission network for the radio path, replacing the connection of the apparatus to the radio antenna by a connection suitable to the type of medium employed.

It will be obvious from the preceding discussion that the general principles herein disclosed may be embodied in many other organizations widely different from those illustrated without departing from the spirit of the invention as defined in the following claims.

What is claimed is:

1. In a plurality of associated signaling stations and a central office all adapted for transmitting and receiving over a single common medium extending to all of them, means fixed in adjustment at each associated station for transmitting and receiving between it and the central office on carrier frequency channels different from those of all other associated stations, means at each of said stations for transmitting to and receiving from the central office on frequencies different from said earlier mentioned frequencies, and means at the central office for automatically adjusting the frequency transmitting and receiving apparatus thereat to match said first mentioned means in accordance with signals transmitted from a station on said second mentioned means.

2. A plurality of associated stations and a central office all in readiness for connection through a single common medium extending to all of them, means at the central office automatically responsive to impulses transmitted over said common medium on a certain frequency from an associated station as a calling station to automatically connect it to any other particular associated called station over said medium and through said central office, said means being controlled by means of the impulses sent out from the calling station to establish a connection to the called station on a frequency corresponding to that particular called station only and different from any frequency available for the initial connection from the calling station to the central office.

3. A plurality of subscribers' stations and a central office, a carrier frequency channel extending from said central office to a subscriber's station, other carrier frequency channels extending from said central office to other subscribers' stations, means responsive to signals transmitted over said first channel from a subscriber's station for automatically connecting said first channel to any of said other channels, said means involving frequency selective devices whose electrical constants are continuously variable as distinguished from a variation by cutting elements in or out, so that no switched contacts are included in the transmission path, and means at said subscribers' stations for transmitting carrier frequencies to and receiving carrier frequencies from said respective channels.

4. A common transmission medium extending to each of a plurality of subscribers' stations and to a central office, and means at said central office, automatically responsive to carrier frequency signals transmitted over said medium from said subscribers' stations to automatically establish and simultaneously maintain a plurality of communications between any one and any other of said subscribers' stations in pairs.

5. A common transmission medium extending to each of a plurality of subscribers' stations and to a central office, and connecting means including a plurality of voice frequency circuits at said central office, said means being automatically responsive to carrier frequency signals transmitted over said medium from said subscribers' stations to automatically establish and simultaneously maintain a plurality of telephone connections between any one and any other of said subscribers' stations in pairs.

6. A common transmission medium extending to each of a plurality of subscribers' stations and to a central office, and connecting means including a plurality of carrier frequency circuits at the central office, said means being automatically responsive to carrier frequency signals transmitted over said medium from said subscribers' stations to automatically establish and simultaneously maintain a plurality of telephone connections between any one and any other of said subscribers' stations in pairs.

7. A common transmission medium extending to each of a plurality of subscribers' stations and to a central office, and connecting means including a plurality of two-wire circuits at said central office, said means being automatically responsive to carrier frequency signals transmitted over said medium from said subscribers' stations to automatically establish and simultaneously maintain a plurality of telephone connections between any one and any other of said subscribers' stations in pairs.

8. A common transmission medium extending to each of a plurality of subscribers' stations and to a central office, and connecting means including a plurality of four-wire circuits at said central office, said means being automatically responsive to carrier frequency signals transmitted over said medium from said subscribers' stations to automatically establish and simultaneously maintain a plurality of telephone connections between any one and any other of said subscribers' stations in pairs.

9. A common transmission medium extending to each of a plurality of subscribers' stations and to a central office, and connecting means at said central office, said means being automatically responsive to carrier frequency signals transmitted over said medium from said stations to automatically establish and simultaneously maintain a plurality of telephone connections between any one and any other of said subscribers' stations in pairs, said means involving frequency selective devices whose electrical constants are continuously variable as distinguished from a variation by cutting elements in or out, so that no switched contacts are included in the transmission path.

10. In a system whereby a plurality of simultaneous exchanges of intelligence may be effected over a single common transmission medium and through a central office between any one and any other of a plurality of subscribers' stations taken in pairs, means at each subscriber's station for transmitting from the subscriber's station to the central office a series of carrier frequency pulses for operating interconnecting apparatus at the central office.

11. In a telephone exchange system, a plurality of individual subscribers' stations and a central station, a single common transmission medium extending to each subscriber's station and to the central office, means at each individual subscriber's station to select one of a plurality of pairs of frequencies for transmission from the subscriber's station to and reception at the subscriber's station from said central office, and means at each subscriber's station for transmitting from the subscriber's station to the central office carrier frequency pulses at the selected transmitting frequency for operating interconnecting apparatus at the central office to interconnect any one of said stations with any other of said stations through the central office and over said common medium.

12. A system for the interchange of intelligence comprising a single common transmission medium extending to each of a plurality of subscribers' stations and to a central office, means at each subscriber's station for transmitting carrier frequency signals to said medium and receiving carrier frequency signals from said medium, means at the central office including automatic frequency shifting apparatus operated under the control of carrier frequency impulses transmitted over said common medium from any subscriber's station for receiving the carrier frequency signals transmitted over said common medium by any station and shifting them to the frequency location of any called subscriber's station, and means for transmitting the shifted carrier frequency signals to said called subscriber's station over said common medium.

13. In a system for the interchange of intelligence, a single common transmission medium extending to each of a plurality of subscribers' stations and to a central office, means at each subscriber's station for transmitting carrier frequency signals to said medium and receiving carrier frequency signals from said medium, and means at the central office including automatic frequency shifting apparatus operated under the control of carrier frequency impulses from any subscriber's station for receiving the carrier frequency signals transmitted over said common medium by any subscriber's station and shifting them to a new frequency location without being brought down to the voice frequency range and means for transmitting the shifted carrier frequency signals to any other station over said common medium, said means permitting a plurality of such interchanges to be carried out simultaneously over said common medium.

14. In a system for the exchange of intelligence, a plurality of individual subscribers' stations and a central station, a single common transmission medium extending to each of said subscriber's stations and said central station, said stations employing frequency selection for the simultaneous interconnection of any one with any other of said subscribers' stations in pairs over said common medium, means at said central station for automatically selecting one of a plurality of sets of connecting mechanisms, and means for controlling said mechanism by carrier frequency pulses transmitted from any of said individual subscribers' stations over said common medium for effecting all such interconnections.

15. In a system for the exchange of intelligence, a plurality of individual subscribers' stations and a central station, a single common transmission medium extending to each of said subscriber's stations and said central station, means at the central station whereby carrier frequency signals transmitted from any calling subscriber's station over said common medium are converted to a common frequency, means also at the central station for automatically selecting one of a plurality of connecting mechanisms and connecting said calling subscriber's station to said selected mechanism, means for controlling said mechanism by carrier frequency pulses transmitted from said calling subscriber's station over said common medium to convert the received signals from the common frequency to the carrier frequency of any other subscriber's station which is called, and means to transmit the carrier frequency of any called station over said common medium.

16. In a system for the exchange of intelligence, a plurality of stations and a central office, each connected to a common medium and employing frequency selection for the simultaneous interconnection of stations in pairs, a plurality of fixed frequency transmitting and receiving circuits at the central office, one for each station, connected to the common medium, and apparatus for automatically connecting under control of carrier frequency impulses received from one of said stations, the transmitting and receiving apparatus associated with said station to that associated with any other station.

17. A telephone exchange system, comprising a plurality of stations and a central office, a common transmission medium extending to each of said stations and said central office, means at each station for transmitting to and receiving from said central office on any of a plurality of pairs of frequencies, a plurality of fixed frequency transmitting and receiving circuits at said central office, each capable of receiving and transmitting one of said pairs of frequencies, a plurality of variable frequency transmitting and receiving circuits, one connected to each of said fixed frequency circuits, means for adjusting each variable frequency circuit under control of carrier frequency pulses received by the associated fixed frequency circuit for connecting a called station to a calling station.

18. A telephone exchange system comprising a plurality of individual stations and a central office, each associated with a common medium and employing frequency selection for the simultaneous interconnection of stations in pairs, means at the central office including a plurality of continuously variable frequency transmitting and receiving circuits, each arranged to stop and remain fixed in frequency upon receipt of a transmitting carrier from any one of said stations, other variable frequency transmitting and receiving circuits, one permanently associated with each of said first variable frequency circuits, means associated with each of said first circuits for automatically adjusting under the control of carrier frequency impulses received from said station the frequencies of said other circuits to provide a connection between said station and any other station.

19. In a central station for the automatic interconnection over a common medium of a plurality of individual stations, each employing different fixed carrier frequencies for transmission and other and different fixed carrier frequencies for reception, a plurality of variable frequency transmitting and receiving circuits, the frequencies of each of said circuits being continuously varied by motors, one for each transmitting and receiving circuit, means including a plurality of relays whereby when the transmitting carrier frequency of any of said individual stations is received momentarily by one of said variable frequency circuits its associated motor is stopped, and means to prevent the motor associated with any other variable frequency circuit from stopping due to the receipt of said carrier frequency.

20. In a system for the exchange of intelligence, a plurality of individual subscribers' stations and a central station, a single common transmission medium extending to each of said subscribers' stations and said central station, means at each individual subscriber's station for transmitting and receiving carrier frequency signals to and from said common medium, means at the central station to transmit back to a calling subscriber's station a modulated carrier frequency signal to indicate that the central station is in readiness to function, and means also at the central station to automatically interconnect any calling subscriber's station to any called subscriber's station over said common medium and through said central station under control of carrier frequency signals transmitted over said medium from said calling station.

21. In a system for the exchange of intelligence, a plurality of individual subscribers' stations and a central station, a single common transmission medium extending to each of said subscribers' stations and said central station, means at each individual subscriber's station for transmitting and receiving carrier frequency signals to and from said common medium, means at the central station for automatically connecting under control of carrier frequency impulses received from any one of said individual subscribers' stations said individual subscriber's station with any other of said individual subscribers' stations over said common medium and through said central station, and means whereby the connection is not completed and a modulated carrier frequency is automatically transmitted over said medium to said first individual subscriber's station if said second individual subscriber's station is in use for another connection.

22. In combination, a central station and associated stations all in readiness for two-way signaling between them in pairs through a single common medium and through said central station, the central station comprising sets of apparatus elements, each set having an apparatus element of distinctive fixed frequency which is selectively responsive to that frequency for intersignaling with an associated calling station, each set also having an apparatus element of adjustable frequency for intersignaling with an associated called station, each associated station having a distinctive fixed frequency element to which said last mentioned apparatus element may be adjusted to gain a selective response therefrom, and each said central station set having an adjustable frequency shifter operatively connecting its said apparatus elements.

23. In combination, a central station and associated stations all in readiness for two-way signaling between any one and any other of said associated stations in pairs through a single common medium and through said central station, each associated station having apparatus of distinctive fixed frequency for intersignaling over said common medium with the central station, and the central station having apparatus selectively responsive to incoming signals transmitted over said common medium at the respective frequencies from the associated stations as calling stations, the central station also having further apparatus adjustable through said first mentioned central station apparatus and in response to code impulses from the calling stations for intersignaling with the associated stations as called stations on their fixed frequency apparatus.

ESTILL I. GREEN.